(12) United States Patent
Akkarakaran et al.

(10) Patent No.: US 10,779,240 B2
(45) Date of Patent: *Sep. 15, 2020

(54) MULTI-LINK TRANSMIT POWER CONTROL FOR A PLURALITY OF UPLINK BEAM PAIRS

(71) Applicant: QUALCOMM Incorporated, San Diego, CA (US)

(72) Inventors: Sony Akkarakaran, Poway, CA (US); Tao Luo, San Diego, CA (US); Makesh Pravin John Wilson, San Diego, CA (US); Xiao feng Wang, San Diego, CA (US); Kaushik Chakraborty, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,921

(22) Filed: Nov. 8, 2019

(65) Prior Publication Data

US 2020/0077342 A1    Mar. 5, 2020

Related U.S. Application Data

(63) Continuation of application No. 15/862,275, filed on Jan. 4, 2018, now Pat. No. 10,477,484.
(Continued)

(51) Int. Cl.
*H04W 52/14* (2009.01)
*H04W 52/54* (2009.01)
(Continued)

(52) U.S. Cl.
CPC ......... *H04W 52/14* (2013.01); *H04W 52/146* (2013.01); *H04W 52/325* (2013.01);
(Continued)

(58) Field of Classification Search
USPC ......................................................... 455/522
See application file for complete search history.

(56) References Cited

U.S. PATENT DOCUMENTS

| 8,462,741 | B2 | 6/2013 | Zhang et al. |
| 9,019,880 | B2 | 4/2015 | Ehsan et al. |

(Continued)

FOREIGN PATENT DOCUMENTS

WO    2016086144 A1    6/2016

OTHER PUBLICATIONS

International Search Report and Written Opinion—PCT/US2018/012614—ISA/EPO—Apr. 20, 2018.
(Continued)

*Primary Examiner* — Philip Sobutka
(74) *Attorney, Agent, or Firm* — Harrity & Harrity, LLP/Qualcomm

(57) ABSTRACT

Certain aspects of the present disclosure generally relate to wireless communication. In some aspects, a wireless communication device may receive one or more downlink control information (DCI) transmissions including a plurality of transmit power control (TPC) commands. The plurality of TPC commands may relate to an uplink channel transmit power for a plurality of uplink beam-pairs. The wireless communication device may determine the uplink channel transmit power for the plurality of uplink beam-pairs based at least in part on the plurality of TPC commands. Numerous other aspects are provided.

30 Claims, 10 Drawing Sheets

900

920: Determine a plurality of transmit powers for a plurality of uplink beam pairs

UE 120

910: Multicast transmission (DCI with TPC commands)

930-1: Transmit on first uplink beam-pair with first transmit power 930-2: Transmit on second uplink beam-pair with second transmit power

BS 110

Related U.S. Application Data

(60) Provisional application No. 62/469,933, filed on Mar. 10, 2017.

(51) Int. Cl.

| | | |
|---|---|---|
| *H04W 52/32* | (2009.01) | |
| *H04W 52/34* | (2009.01) | |
| *H04W 52/42* | (2009.01) | |
| *H04W 52/36* | (2009.01) | |
| *H04W 88/02* | (2009.01) | |
| *H04W 88/08* | (2009.01) | |

(52) U.S. Cl.
CPC ....... *H04W 52/327* (2013.01); *H04W 52/346* (2013.01); *H04W 52/362* (2013.01); *H04W 52/42* (2013.01); *H04W 52/54* (2013.01); *H04W 52/545* (2013.01); *H04W 88/02* (2013.01); *H04W 88/08* (2013.01)

(56) References Cited

U.S. PATENT DOCUMENTS

| | | | |
|---|---|---|---|
| 9,220,073 B2 | 12/2015 | Zhang et al. | |
| 9,585,108 B2 | 2/2017 | Damnjanovic et al. | |
| 10,477,484 B2 * | 11/2019 | Akkarakaran | H04W 52/545 |
| 2010/0302983 A1 | 12/2010 | McBeath et al. | |
| 2014/0315594 A1 | 10/2014 | Jeong et al. | |
| 2016/0128045 A1 | 5/2016 | Azarian Yazdi et al. | |
| 2017/0134080 A1 | 5/2017 | Rahman et al. | |
| 2018/0199212 A1 | 7/2018 | Lin et al. | |
| 2018/0206132 A1* | 7/2018 | Guo | H04B 7/0404 |
| 2018/0219606 A1* | 8/2018 | Ng | H04B 7/0695 |
| 2018/0220400 A1 | 8/2018 | Nogami et al. | |

OTHER PUBLICATIONS

Samsung: "UL Power Control Aspects", 3GPP Draft; R1-1702964 UL Power Control Aspects Samsung, 3rd Generation Partnership Project (3GPP), Mobile Competence Centre; 650, Route Des Lucioles; F-06921 Sophia-Antipolis Cedex; France, vol. RAN WG1, Athens, Greece; Feb. 13, 2017-Feb. 17, 2013 Feb. 12, 2017 (Feb. 12, 2017), XP051210107, pp. 1-4, Retrieved from the Internet: URL:http://www.3gpp.org/ftp/Meetings_3GPP SYNC/RAN1/Docs/ [retrieved on Feb. 12, 2017].

* cited by examiner

MULTI-LINK TRANSMIT POWER CONTROL FOR A PLURALITY OF UPLINK BEAM PAIRS

CROSS-REFERENCE TO RELATED APPLICATIONS UNDER 35 U.S.C. § 119

This application is a continuation of U.S. patent application Ser. No. 15/862,275, filed on Jan. 4, 2018 (now U.S. Pat. No. 10,477,484), entitled "TECHNIQUES AND APPARATUSES FOR MULTI-LINK TRANSMIT POWER CONTROL," which claims priority to U.S. Provisional Application 62/469,933 filed on Mar. 10, 2017 entitled "TECHNIQUES AND APPARATUSES FOR MULTI-LINK TRANSMIT POWER CONTROL," both of which are incorporated by reference herein.

FIELD OF THE DISCLOSURE

Aspects of the present disclosure generally relate to wireless communication, and more particularly to techniques and apparatuses for multi-link transmit power control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include receiving, by a wireless communication device, one or more downlink control information (DCI) transmissions including a plurality of transmit power control (TPC) commands. The plurality of TPC commands may relate to an uplink channel transmit power for a plurality of uplink beam-pairs. The method may include determining, by the wireless communication device, the uplink channel transmit power for the plurality of uplink beam-pairs based at least in part on the plurality of TPC commands.

In some aspects, a wireless communication device for wireless communication may include a memory and one or more processors coupled to the memory. The memory and the one or more processors may be configured to receive one or more DCI transmissions including a plurality of TPC command. The plurality of TPC commands may relate to an uplink channel transmit power for a plurality of uplink beam-pairs. The memory and the one or more processors may be configured to determine the uplink channel transmit power for the plurality of uplink beam-pairs based at least in part on the plurality of TPC commands.

In some aspects, a non-transitory computer-readable medium may store one or more instructions for wireless communication. The one or more instructions, when executed by one or more processors of a wireless communication device, may cause the one or more processors to receive one or more DCI transmissions including a plurality of TPC commands. The plurality of TPC commands may relate to an uplink channel transmit power for a plurality of uplink beam-pairs. The one or more instructions, when executed by the one or more processors, may cause the one or more processors to determine the uplink channel transmit power for the plurality of uplink beam-pairs based at least in part on the plurality of TPC commands.

In some aspects, an apparatus for wireless communication may include means for receiving one or more DCI transmissions including a plurality of TPC commands. The plurality of TPC commands may relate to an uplink channel transmit power for a plurality of uplink beam-pairs. The apparatus may include means for determining the uplink channel transmit power for the plurality of uplink beam-pairs based at least in part on the plurality of TPC commands.

Aspects generally include a method, apparatus, system, computer program product, non-transitory computer-readable medium, user equipment, wireless communication device, access point, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
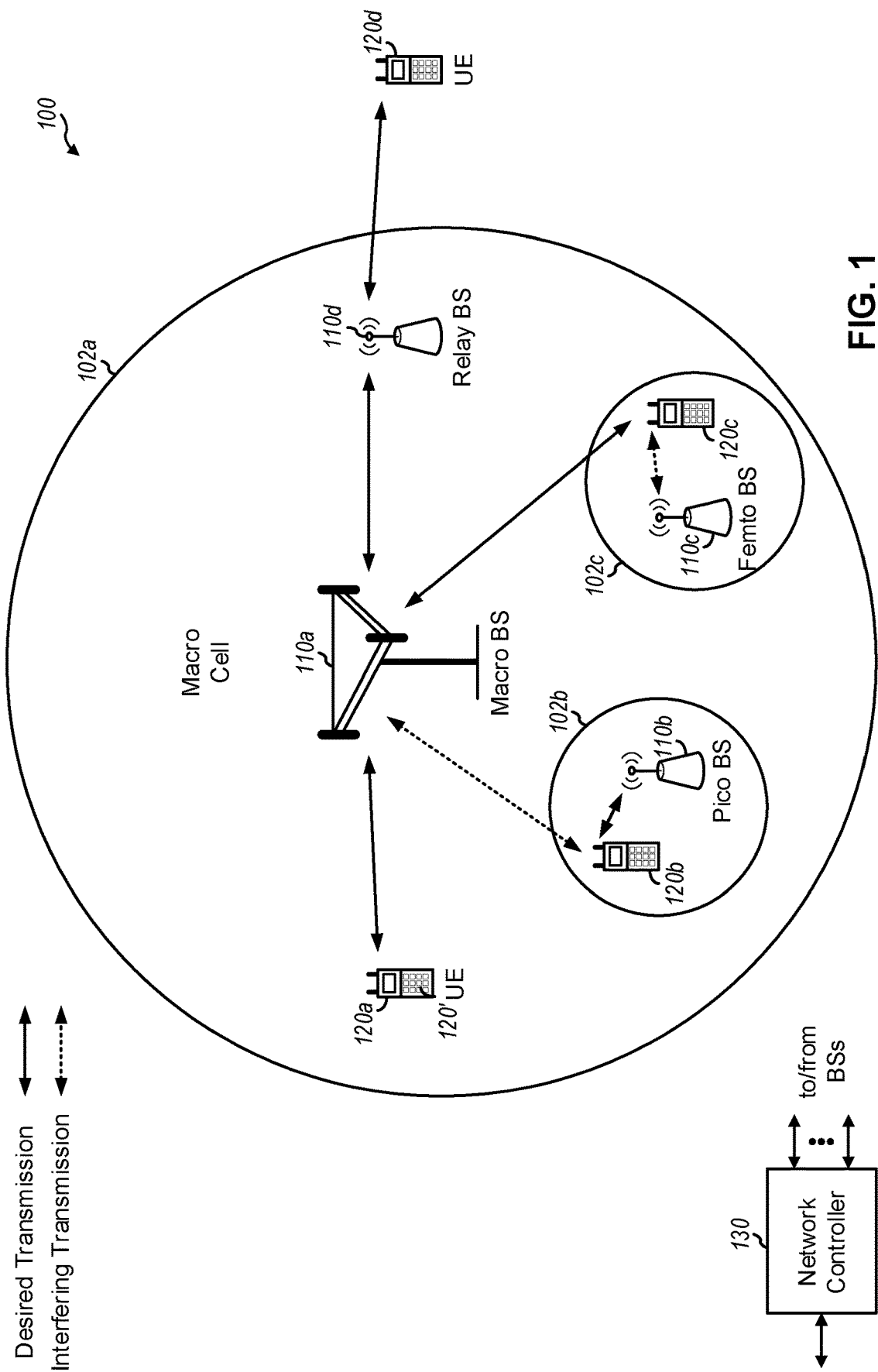
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing 120' that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
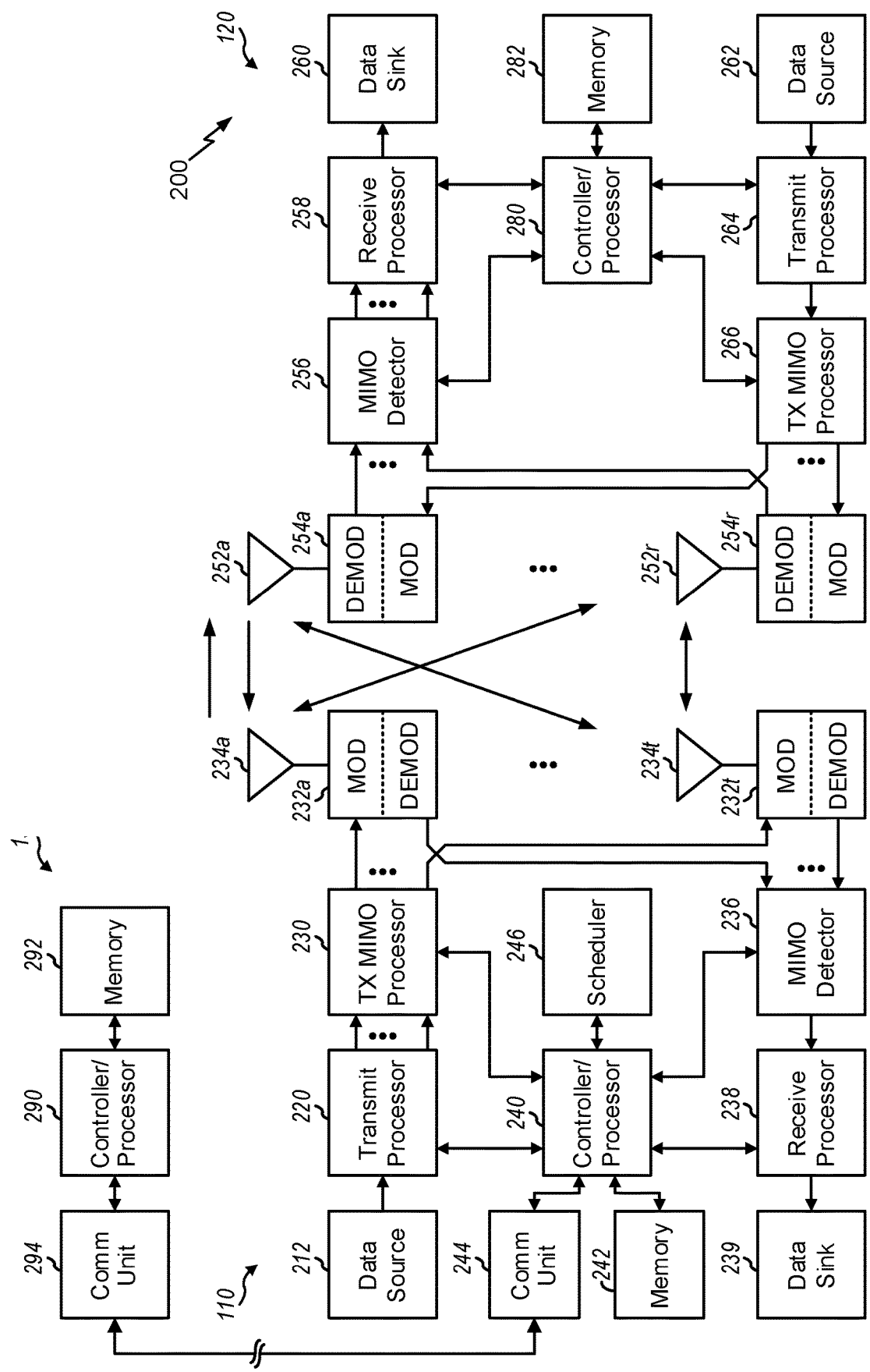
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform transmit power control during multi-link operation. For example, controller/processor 280 and/or other processors and modules at UE 120, may perform or direct operations of UE 120 to perform transmit power control during multi-link operation. For example, controller/processor 280 and/or other controllers/processors and modules at UE 120 may perform or direct operations of, for example, example process 1000 of FIG. 10, process 1100 of FIG. 11, and/or other processes as described herein. In some aspects, one or more of the components shown in FIG. 2 may be employed to perform example process 1000, process 1100, and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving one or more DCI transmissions including a plurality of TPC commands, means for determining the uplink channel transmit power for the plurality of uplink beam-pairs based at least in part on the plurality of TPC commands, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
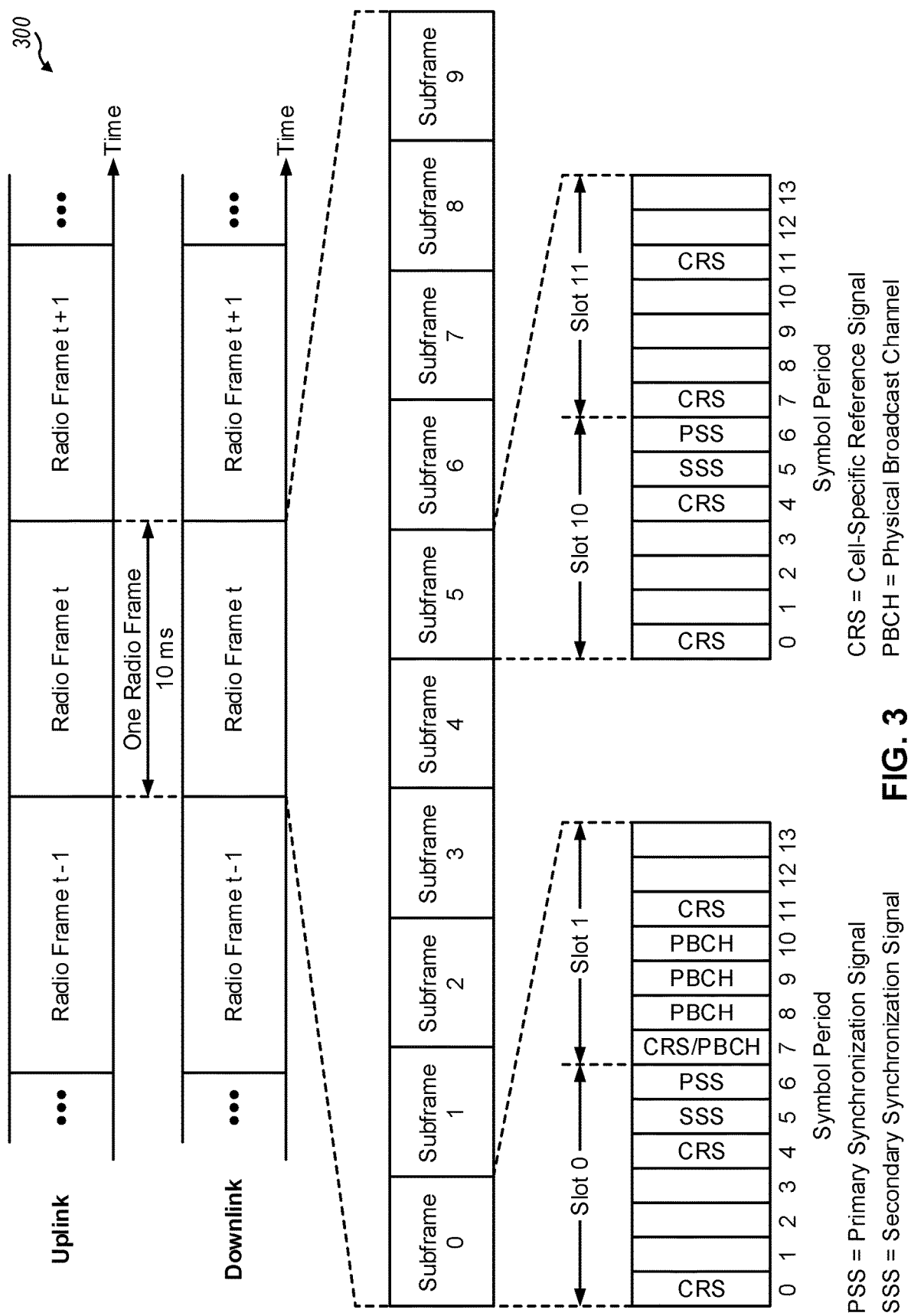
FIG. 3 is a block diagram conceptually illustrating an example of a frame structure in a wireless communication network, in accordance with certain aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2 L symbol periods in each subframe may be assigned indices of 0 through 2 L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
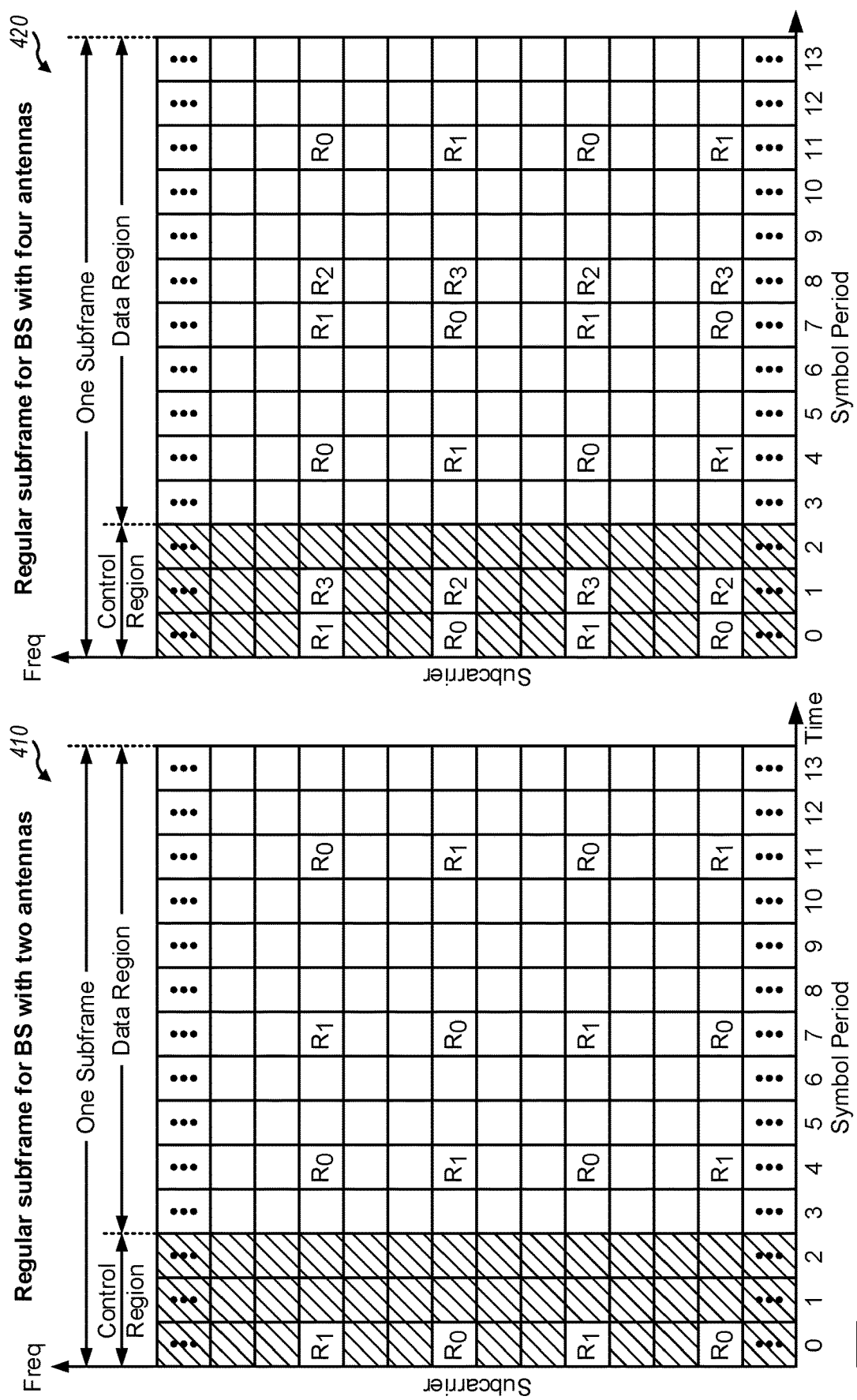
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM)

and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
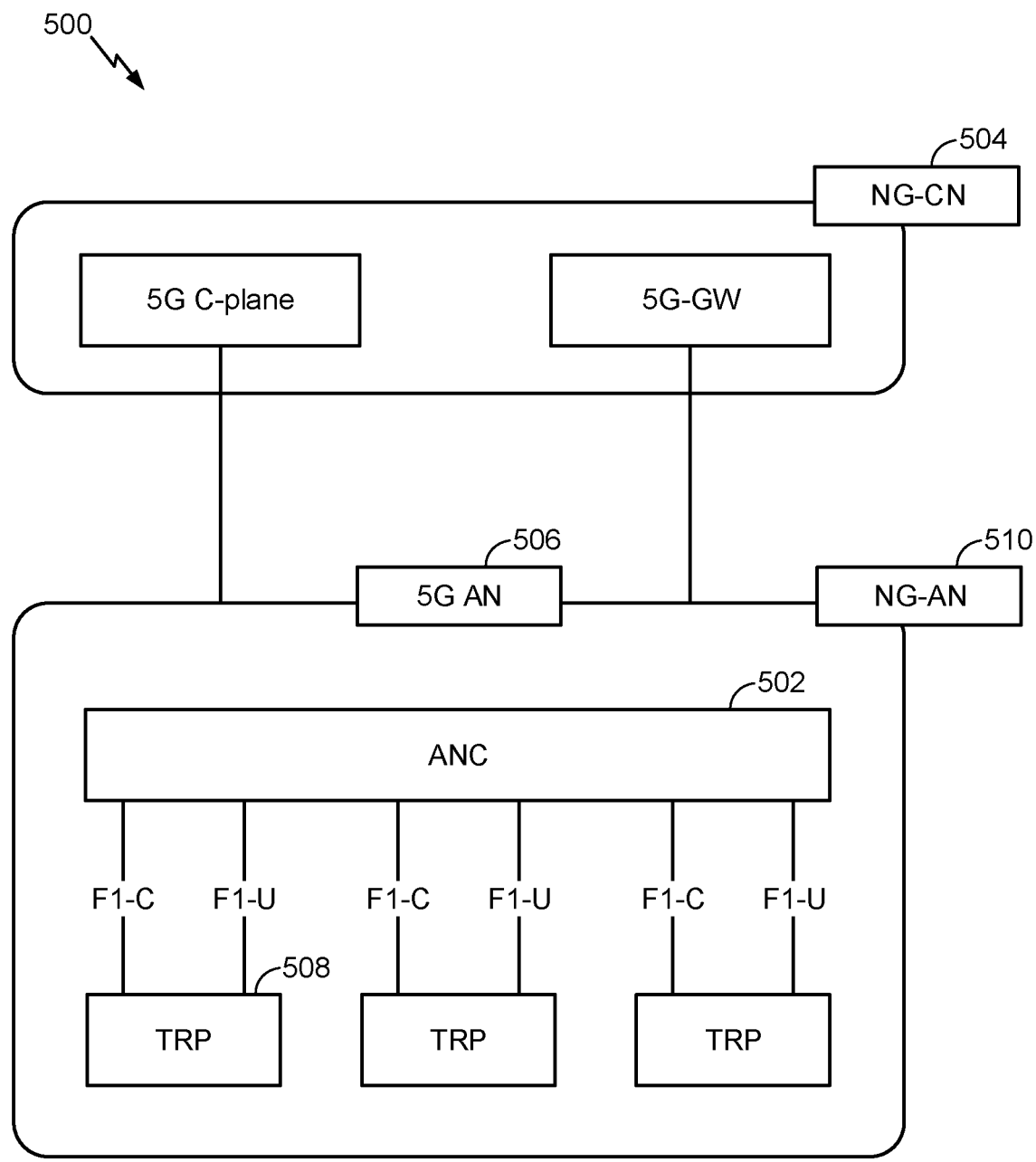
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
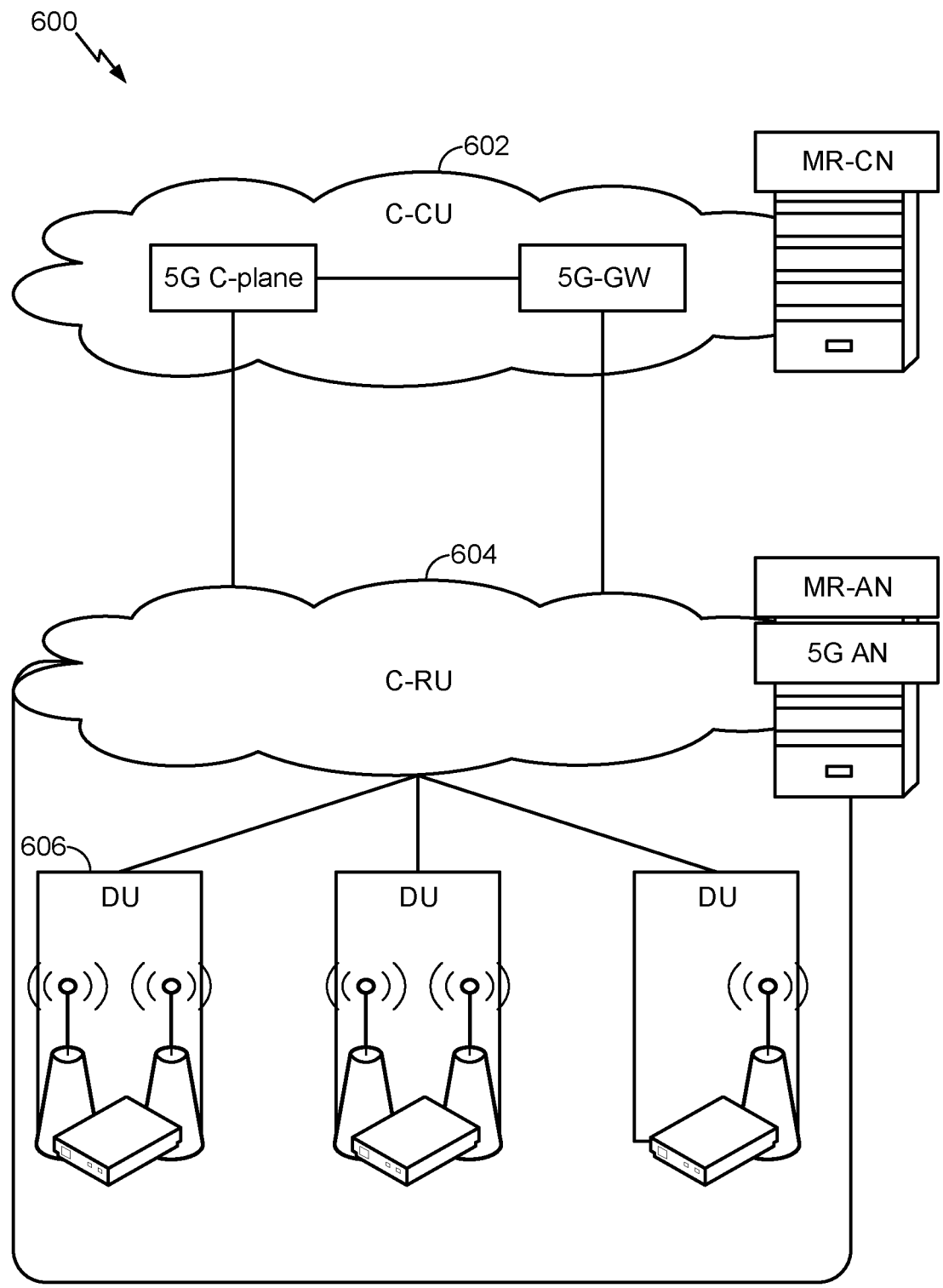
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
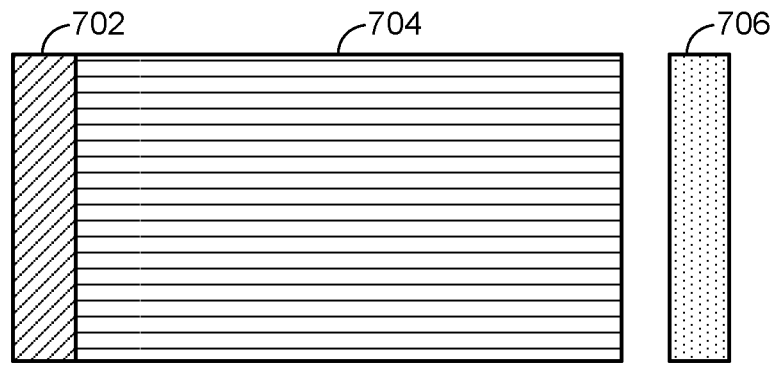
FIG. 7 is a diagram illustrating an example of a downlink (DL)-centric subframe, in accordance with certain aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
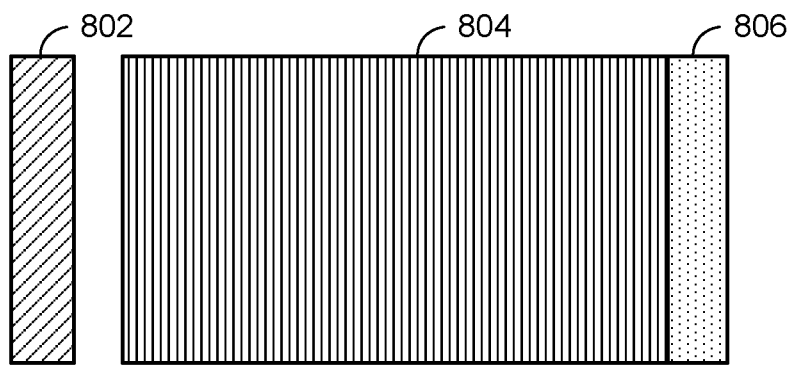
FIG. 8 is a diagram illustrating an example of an uplink (UL)-centric subframe, in accordance with certain aspects of the present disclosure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A wireless communication device, such as a user equipment (e.g., UE 120) and/or the like, may operate in a new radio (NR) network. The wireless communication device may utilize multiple links for operation in the NR network. For example, the wireless communication device may monitor a PDCCH associated with multiple beam-pair links. Additionally, or alternatively, the wireless communication device may transmit uplink data using multiple beam-pair links. For example, the wireless communication device may transmit a set of PUCCHs, a set of PUSCHs, a set of SRSs, and/or the like using multiple uplink beam-pair links. An uplink beam-pair may refer to a beam for uplink transmission transmitted by the wireless communication device and a corresponding beam for uplink reception at an access point, such as BS 110. Similarly, a downlink beam-pair may refer to a beam for downlink transmission by a base station or access point to a wireless communication device and a corresponding beam for downlink reception at the wireless communication device.

The wireless communication device may transmit repetitions of a particular channel using multiple uplink beam-pair links. For example, the wireless communication device may transmit a first repetition of a PUCCH using a first uplink beam-pair and a second repetition of the PUCCH using a second uplink beam-pair. Additionally, or alternatively, the wireless communication device may transmit a PUCCH using a first uplink beam-pair and a PUSCH using a second uplink beam-pair.

The wireless communication device may transmit data using multiple uplink beam-pairs to a single cell. Additionally, or alternatively, the wireless communication device may transmit different uplink beam-pairs to different cells. For example, when the wireless communication device is operating in a coordinated multipoint (CoMP) mode, the wireless communication device may transmit data using a first uplink beam-pair to a first cell and a second uplink beam-pair to a second cell. In this way, the wireless communication device may utilize multiple beam-pair links to provide redundancy in data transmission and reception, thereby improving a robustness to errors associated with a particular beam-pair link relative to operating in a single link mode. However, using transmit power control signaling for a single link may result in incorrect gain settings, interference conditions, and/or the like when applied to multiple links.

Techniques and apparatuses, described herein, permit a wireless communication device to determine an uplink channel transmit power for a plurality of uplink beam-pairs. For example, based at least in part on receiving one or more downlink control information (DCI) transmissions including a plurality of transmit power control (TPC) commands from one or more access points, the wireless communication device may determine the uplink channel transmit power for the plurality of uplink beam-pairs, and may transmit data on the plurality of uplink beam-pairs using the determined uplink channel transmit power. In this way, power control may be achieved for multi-link communication.

Figure 9:
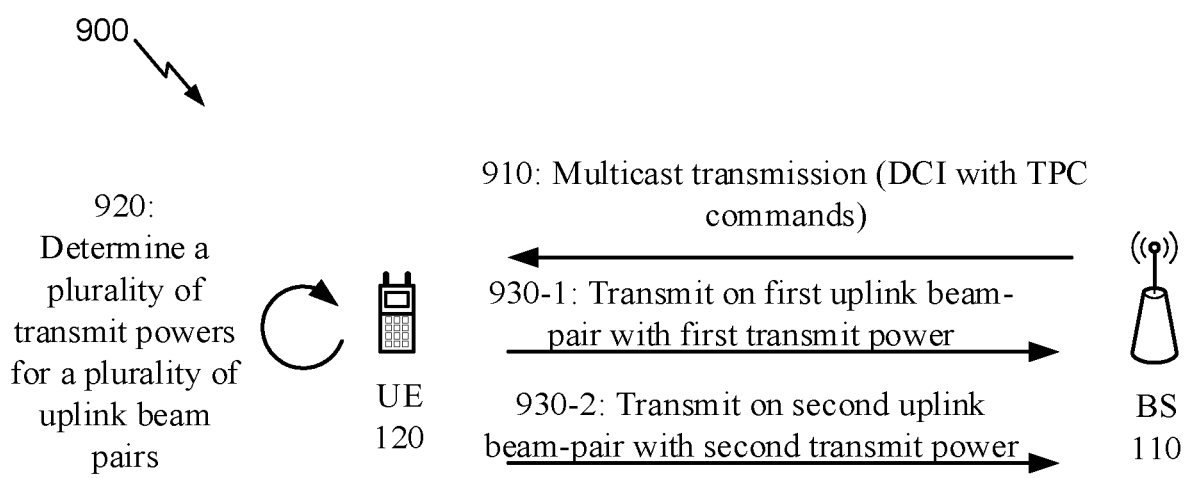
FIG. 9 is a diagram illustrating an example of a wireless communication device performing multi-link transmit power control, in accordance with certain aspects of the present disclosure.

FIG. 9 is a diagram illustrating an example 900 of multi-link transmit power control. As shown in FIG. 9, example 900 may include a BS 110 and a UE 120.

As further shown in FIG. 9, and by reference number 910, UE 120 may receive a multicast transmission conveying one or more DCI transmissions including a plurality of TPC commands. In some aspects, UE 120 may receive one or more DCI transmissions including the plurality of TPC commands. For example, UE 120 may receive one or more DCI transmissions with a plurality of indicators of a plurality of transmit powers.

As further shown in FIG. 9, and by reference number 920, UE 120 may determine a plurality of transmit powers for a plurality of uplink beam-pairs. For example, UE 120 may determine a common transmit power for the plurality of uplink beam-pairs. Additionally, or alternatively, UE 120 may determine a plurality of different transmit powers for the plurality of uplink beam-pairs. Additionally, or alternatively, UE 120 may determine a first transmit power for a first uplink beam-pair and a second transmit power for a plurality of second uplink beam-pairs.

As further shown in FIG. 9, and by reference numbers 930-1 and 930-2, UE 120 may transmit a plurality of uplink beam-pairs with a plurality of transmit powers. For example, UE 120 may transmit a first uplink beam-pair with a first transmit power using a first antenna, antenna element, or antenna element array, and may transmit a second uplink beam-pair with a second transmit power using a second antenna, antenna element, or antenna element array. In some aspects, UE 120 may transmit the plurality of uplink beam-pairs to a plurality of BSs 110. For example, UE 120 may transmit using a first uplink beam-pair or a first set of uplink beam-pairs to a first BS 110, a second uplink beam-pair or a second set of uplink beam-pairs to a second BS 110, and/or the like. In some aspects, UE 120 may transmit a plurality of types of channels based at least in part on the plurality of transmit powers. For example, the plurality of types of channels may include at least one of an uplink channel, a supplemental uplink channel, and/or the like. In this case, each uplink channel (e.g., the uplink channel and the supplemental uplink channel) may be associated with a single downlink channel, and may be controlled by different TPC commands sent on the single downlink channel.

As indicated above, FIG. 9 is provided as an example. Other examples are possible and may differ from what was described with respect to FIG. 9.

Figure 10:
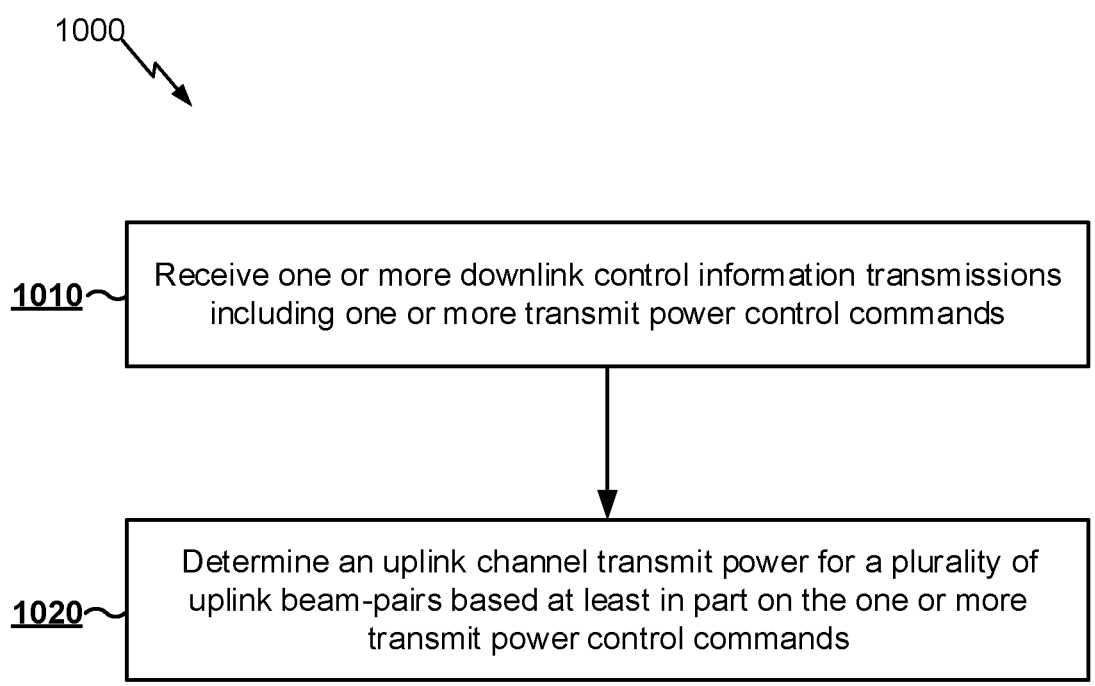
FIG. 10 is a diagram illustrating an example process performed, for example, by a wireless communication device, in accordance with various aspects of the present disclosure.

FIG. 10 is a diagram illustrating an example process 1000 performed, for example, by a wireless communication device, in accordance with various aspects of the present disclosure. Example process 1000 is an example where a wireless communication device (e.g., UE 120) performs multi-link transmit power control.

As shown in FIG. 10, in some aspects, process 1000 may include receiving one or more DCI transmissions including one or more TPC commands (block 1010). For example, the wireless communication device may receive the one or more DCI transmissions, including the one or more TPC commands, from one or more access points (e.g., one or more BSs 110). In some aspects, the one or more TPC commands may relate to an uplink channel transmit power for a plurality of uplink beam-pairs. In some aspects, the wireless communication device may receive a single DCI transmission that conveys multiple TPC commands. For example, an access point may transmit multiple TPC commands that correspond to a sequence of link indices for a set of links in a single DCI transmission, and the wireless communication device may receive the single DCI transmission and extract the TPC commands to determine uplink transmit power for each uplink beam-pair link. Additionally, or alternatively, the wireless communication device may receive multiple DCI transmissions (e.g., via multiple downlink beam-pair links), and the wireless communication device may extract TPC commands from each DCI transmission. In this case, each TPC command associated with each DCI transmission transmitted via each downlink beam-pair may relate to an uplink transmit power for an uplink beam-pair associated, for example based at least in part on beam correspondence or reciprocity, with the downlink beam-pair on which the DCI transmission was received. Additionally, or alternatively, the wireless communication device may receive a single TPC command relating to an uplink transmit power for multiple uplink beam-pairs, a combination of a TPC command relating to multiple uplink beam-pairs and a TPC command relating to a single uplink beam-pair, and/or the like.

In some aspects, the wireless communication device may receive the one or more DCI transmissions via a unicast transmission. For example, an access point (e.g., BS 110) may transmit a unicast transmission directed to the wireless communication device to convey the one or more TPC commands. Additionally, or alternatively, the wireless communication device may receive the one or more DCI transmissions via a multicast transmission. For example, an access point (e.g., BS 110) may transmit a multicast transmission directed to multiple wireless communication devices to convey the one or more TPC commands to the multiple wireless communication devices (e.g., a single TPC command directed to multiple wireless communication devices, multiple TPC commands directed to multiple wireless communication devices, and/or the like). In this case, the wireless communication device may extract TPC bits of a TPC command based at least in part on information identifying a portion of the multicast transmission for utilization by the wireless communication device. In some aspects, the one or more DCI transmissions conveyed via the multicast transmission may be dynamically updated based at least in part on a change to a quantity of links. In some aspects, the multicast transmission may be transmitted by an access point without padding bits. Additionally, or alternatively, the multicast transmission may be transmitted by the access point with padding bits, which the wireless communication device may utilize for verification (e.g., a cyclic redundancy check (CRC)).

In some aspects, the one or more DCI transmissions is a single DCI transmission that includes the one or more TPC commands. In some aspects, the one or more TPC commands includes a plurality of TPC commands, and the single DCI transmission includes the plurality of TPC commands in a sequence corresponding to a sequence of link indices. In some aspects, the one or more TPC commands are received via a unicast transmission.

In some aspects, the one or more TPC commands are received via a multicast transmission, and the multicast transmission includes the one or more TPC commands for a plurality of wireless communication devices. In some aspects, at least one TPC command, of the one or more TPC commands, is extracted by the wireless communication device from the multicast transmission. In some aspects, the multicast transmission does not include a set of padding bits, and a quantity of TPC bits of the multicast transmission is associated with a quantity of TPC commands of the one or more TPC commands. In some aspects, the multicast transmission includes a set of padding bits, and the set of padding bits includes information associated with the one or more TPC commands. In some aspects, the set of padding bits is set to a static value. In some aspects, the uplink channel transmit power for the plurality of uplink beam-pairs is determined based at least in part on a mapping of bits of the multicast transmission to uplink beam-pairs of the plurality of uplink beam-pairs.

As further shown in FIG. 10, in some aspects, process 1000 may include determining an uplink channel transmit power for a plurality of uplink beam-pairs based at least in part on the one or more TPC commands (block 1020). For example, the wireless communication device may determine the uplink channel transmit power for the plurality of uplink beam-pairs based at least in part on the one or more TPC commands. In some aspects, the wireless communication device may determine a transmit power level for the uplink transmit power is determined based at least in part on a power control step-size. In some aspects, the one or more power control step-sizes may set based at least in part on a specification, or may be configured by the network or an access point (e.g., using a master information block (MIB), a master system information block (MSIB), a system information block (SIB), a DCI message, radio resource control (RRC) configuration message, or the like). For example, the wireless communication device may be configured with a single power control step-size for multiple uplink beam-pairs, multiple power control step-sizes for multiple uplink beam-pairs, and/or the like.

In some aspects, data is transmitted on the plurality of uplink beam-pairs using the determined uplink channel transmit power. In some aspects, each of the plurality of uplink beam-pairs is associated with a corresponding TPC command of the one or more TPC commands. In some aspects, the one or more DCI transmissions are a plurality of DCI transmissions, and each DCI transmission, of the plurality of DCI transmissions includes a TPC command of the one or more TPC commands. In some aspects, each DCI transmission, of the plurality of DCI transmissions, includes information identifying a corresponding uplink beam-pair of the plurality of uplink beam-pairs. In some aspects, the plurality of uplink beam-pairs are associated with a single base station. In some aspects, the plurality of uplink beam-pairs are associated with multiple base stations, and the information identifying the corresponding uplink beam-pair includes a cell identifier.

In some aspects, uplink channel transmit powers for two or more of the plurality of uplink beam-pairs are determined based at least in part on a single TPC command of the one or more TPC commands. In some aspects, a power control step-size is determined for the plurality of uplink beam-pairs based at least in part on the one or more TPC commands. In some aspects, a first uplink beam-pair, of the plurality of uplink beam-pairs, is associated with a first power control step-size, a second uplink beam-pair, of the plurality of uplink beam-pairs, is associated with a second power control step-size, and the second power control step-size is different from the first power control step-size. In some aspects, the plurality of uplink beam-pairs are associated with a plurality of types of channels, and the plurality of types of channels include at least one of a PUCCH, a PUSCH, a sounding reference signal (SRS) channel, a scheduling request (SR) channel, a beam recovery (BR) indicator channel, and/or the like. In some aspects, a first TPC command, of the one or more TPC commands, corresponds to a first type of channel of the plurality of types of channels, and a second TPC command, of the one or more TPC commands, corresponds to a second type of channel of the plurality of types of channels.

Process 1000 may include additional aspects, such as any single aspect or any combination of aspects described above.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
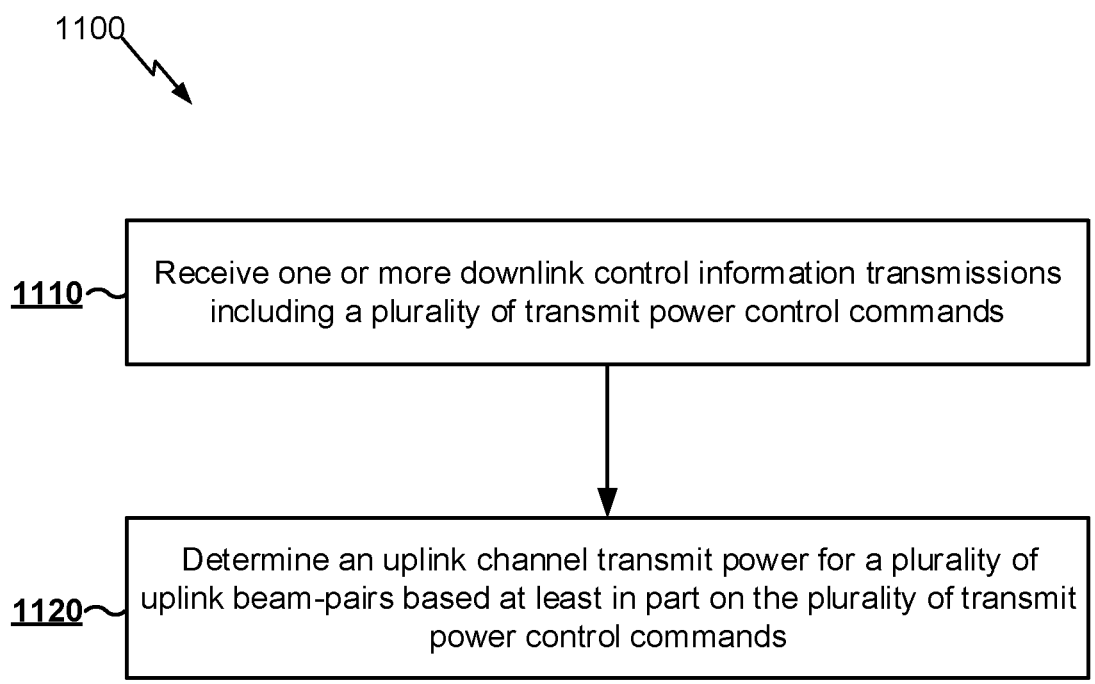
FIG. 11 is a diagram illustrating an example process performed, for example, by a wireless communication device, in accordance with various aspects of the present disclosure.

FIG. 11 is a diagram illustrating an example process 1100 performed, for example, by a wireless communication device, in accordance with various aspects of the present disclosure. Example process 1100 is an example where a wireless communication device (e.g., UE 120) performs multi-link transmit power control.

As shown in FIG. 11, in some aspects, process 1100 may include receiving one or more downlink control information (DCI) transmissions including a plurality of transmit power control (TPC) commands (block 1110). For example, the wireless communication device may receive the one or more DCI transmissions including the plurality of TPC commands from at least one access point (e.g., a BS 110). In some aspects, the plurality of TPC commands relate to an uplink channel transmit power for a plurality of uplink beam-pairs.

For example, the plurality of TPC commands may relate to a plurality of uplink channel transmit powers for the plurality of uplink beam-pairs.

As further shown in FIG. 11, in some aspects, process 1100 may include determining the uplink channel transmit power for the plurality of uplink beam-pairs based at least in part on the plurality of TPC commands (block 1120). For example, the wireless communication device may determine the uplink channel transmit power for the plurality of uplink beam-pairs based at least in part on the plurality of TPC commands.

Process 1100 may include additional aspects, such as any single aspect or any combination of aspects described below.

In some aspects, data is transmitted on the plurality of uplink beam-pairs using the uplink channel transmit power.

In some aspects, each of the plurality of uplink beam-pairs is associated with a corresponding TPC command of the plurality of TPC commands.

In some aspects, the one or more DCI transmissions includes the plurality of TPC commands in a sequence corresponding to a sequence of link indices.

In some aspects, the plurality of uplink beam-pairs are associated with a single base station.

In some aspects, the plurality of uplink beam-pairs are associated with multiple base stations.

In some aspects, each of the plurality of TPC commands is associated with a corresponding cell identifier and information identifying a corresponding uplink beam-pair.

In some aspects, uplink channel transmit powers for two or more of the plurality of uplink beam-pairs are determined based at least in part on a single TPC command of the plurality of TPC commands.

In some aspects, a transmit power level for the uplink channel transmit power is determined based at least in part on a power control step-size.

In some aspects, a first uplink beam-pair, of the plurality of uplink beam-pairs, is associated with a first power control step-size and a second uplink beam-pair, of the plurality of uplink beam-pairs, is associated with a second power control step-size, and the second power control step-size is different from the first power control step-size.

In some aspects, the plurality of TPC commands are received via a unicast transmission.

In some aspects, the plurality of TPC commands are received via a multicast transmission.

In some aspects, the plurality of TPC commands are for a plurality of wireless communication devices.

In some aspects, at least one TPC command, of the plurality of TPC commands, is extracted by the wireless communication device from the multicast transmission.

In some aspects, the multicast transmission does not include a set of padding bits, and the set of padding bits includes information associated with the plurality of TPC commands.

In some aspects, the multicast transmission includes a set of padding bits, and the set of padding bits includes information associated with the plurality of TPC commands.

In some aspects, the set of padding bits is set to a static value.

In some aspects, the uplink channel transmit power for the plurality of uplink beam-pairs is determined based at least in part on a mapping of bits of the multicast transmission to uplink beam-pairs of the plurality of uplink beam-pairs.

In some aspects, the plurality of uplink beam-pairs are associated with a plurality of types of channels, and the plurality of types of channels include a PUCCH, a PUSCH, an SRS channel, an SR channel, a BR indicator channel, and/or the like.

In some aspects, a first TPC command, of the plurality of TPC commands, corresponds to a first type of channel of the plurality of types of channels, and a second TPC command, of the plurality of TPC commands, corresponds to a second type of channel of the plurality of types of channels.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

In this way, a wireless communication device (e.g., UE 120) may control a transmit power for multiple uplink beam-pairs when operating in a multi-link mode.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communications, comprising:
identifying, by a base station, one or more downlink control information (DCI) transmissions including a plurality of transmit power control (TPC) commands, the plurality of TPC commands relating to a plurality of uplink beam-pairs,
a first TPC command, of the plurality of TPC commands, corresponding to a first type of channel, and
a second TPC command, of the plurality of TPC commands, corresponding to a second type of channel; and
providing, by the base station and to a wireless communication device, the one or more DCI transmissions.

2. The method of claim 1, wherein data is transmitted on the plurality of uplink beam-pairs using an uplink channel transmit power.

3. The method of claim 1, further comprising:
receiving a first uplink beam-pair, of the plurality of uplink beam-pairs, from the wireless communication device after providing the one or more DCI transmissions; and
receiving a second uplink beam-pair, of the plurality of uplink beam-pairs, from the wireless communication device after providing the one or more DCI transmissions.

4. The method of claim 3,
wherein the first uplink beam-pair is transmitted with a first transmit power, and
wherein the second uplink beam-pair is transmitted with a second transmit power.

5. The method of claim 1, wherein each of the plurality of uplink beam-pairs is associated with a corresponding TPC command of the plurality of TPC commands.

6. The method of claim 1, wherein the one or more DCI transmissions include the plurality of TPC commands in a sequence corresponding to a sequence of link indices.

7. The method of claim 1, wherein each of the plurality of TPC commands is associated with a corresponding cell identifier and information identifying a corresponding uplink beam-pair.

8. The method of claim 1, wherein uplink channel transmit powers for two or more of the plurality of uplink beam-pairs are determined based at least in part on a single TPC command of the plurality of TPC commands.

9. The method of claim 1, wherein the plurality of TPC commands are provided via a multicast transmission.

10. The method of claim 9,
wherein the multicast transmission does not include a set of padding bits, and
wherein a quantity of TPC bits of the multicast transmission is associated with a quantity of TPC commands of the plurality of TPC commands.

11. The method of claim 9,
wherein the multicast transmission includes a set of padding bits, and
wherein the set of padding bits includes information associated with the plurality of TPC commands.

12. A base station for wireless communication, comprising:
a memory; and
one or more processors operatively coupled to the memory, the memory and the one or more processors configured to:
identify one or more downlink control information (DCI) transmissions including a plurality of transmit power control (TPC) commands, the plurality of TPC commands relating to a plurality of uplink beam-pairs,
a first TPC command, of the plurality of TPC commands, corresponding to a first type of channel, and
a second TPC command, of the plurality of TPC commands, corresponding to a second type of channel; and
provide, to a wireless communication device, the one or more DCI transmissions.

13. The device of claim 12, wherein data is transmitted on the plurality of uplink beam-pairs using an uplink channel transmit power.

14. The device of claim 12, wherein each of the plurality of uplink beam-pairs is associated with a corresponding TPC command of the plurality of TPC commands.

15. The device of claim 12, wherein the one or more DCI transmissions include the plurality of TPC commands in a sequence corresponding to a sequence of link indices.

16. The device of claim 12, wherein each of the plurality of TPC commands is associated with a corresponding cell identifier and information identifying a corresponding uplink beam-pair.

17. The device of claim 12, wherein uplink channel transmit powers for two or more of the plurality of uplink beam-pairs are determined based at least in part on a single TPC command of the plurality of TPC commands.

18. A non-transitory computer-readable medium storing one or more instructions for wireless communication, the one or more instructions comprising:
one or more instructions that, when executed by one or more processors of a base station, cause the one or more processors to:
identify one or more downlink control information (DCI) transmissions including a plurality of transmit power control (TPC) commands, the plurality of TPC commands relating to a plurality of uplink beam-pairs,
a first TPC command, of the plurality of TPC commands, corresponding to a first type of channel, and
a second TPC command, of the plurality of TPC commands, corresponding to a second type of channel; and
provide, to a wireless communication device, the one or more DCI transmissions.

19. The non-transitory computer-readable medium of claim 18, wherein data is transmitted on the plurality of uplink beam-pairs using an uplink channel transmit power.

20. The non-transitory computer-readable medium of claim 18, wherein each of the plurality of uplink beam-pairs is associated with a corresponding TPC command of the plurality of TPC commands.

21. The non-transitory computer-readable medium of claim 18, wherein the one or more DCI transmissions include the plurality of TPC commands in a sequence corresponding to a sequence of link indices.

22. The non-transitory computer-readable medium of claim 18, wherein each of the plurality of TPC commands is associated with a corresponding cell identifier and information identifying a corresponding uplink beam-pair.

23. The non-transitory computer-readable medium of claim 18, wherein uplink channel transmit powers for two or more of the plurality of uplink beam-pairs are determined based at least in part on a single TPC command of the plurality of TPC commands.

24. An apparatus for wireless communication, comprising:
- means for identifying, by a base station, one or more downlink control information (DCI) transmissions including a plurality of transmit power control (TPC) commands,
  - the plurality of TPC commands relating to a plurality of uplink beam-pairs,
    - a first TPC command, of the plurality of TPC commands, corresponding to a first type of channel, and
    - a second TPC command, of the plurality of TPC commands, corresponding to a second type of channel; and
- means for providing, by the base station and to a wireless communication device, the one or more DCI transmissions.

25. The apparatus of claim 24, wherein data is transmitted on the plurality of uplink beam-pairs using an uplink channel transmit power.

26. The apparatus of claim 24, wherein each of the plurality of uplink beam-pairs is associated with a corresponding TPC command of the plurality of TPC commands.

27. The apparatus of claim 24, wherein the one or more DCI transmissions include the plurality of TPC commands in a sequence corresponding to a sequence of link indices.

28. The apparatus of claim 24, wherein each of the plurality of TPC commands is associated with a corresponding cell identifier and information identifying a corresponding uplink beam-pair.

29. The apparatus of claim 24, wherein uplink channel transmit powers for two or more of the plurality of uplink beam-pairs are determined based at least in part on a single TPC command of the plurality of TPC commands.

30. The apparatus of claim 24,
- wherein the plurality of TPC commands are provided via a multicast transmission, and
- wherein a quantity of TPC bits of the multicast transmission is associated with a quantity of TPC commands of the plurality of TPC commands.

\* \* \* \* \*